United States Patent
Negri Jimenez et al.

(10) Patent No.: US 11,939,484 B2
(45) Date of Patent: *Mar. 26, 2024

(54) THREE-DIMENSIONAL PRINTING

(71) Applicant: Hewlett-Packard Development Company, L.P., Spring, TX (US)

(72) Inventors: Graciela E. Negri Jimenez, San Diego, CA (US); Michael A. Novick, San Diego, CA (US); Tienteh Chen, San Diego, CA (US); Jacob Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/298,927

(22) PCT Filed: Jun. 10, 2019

(86) PCT No.: PCT/US2019/036297
§ 371 (c)(1),
(2) Date: Jun. 1, 2021

(87) PCT Pub. No.: WO2020/251528
PCT Pub. Date: Dec. 17, 2020

(65) Prior Publication Data
US 2022/0112393 A1    Apr. 14, 2022

(51) Int. Cl.
*C09D 11/54*   (2014.01)
*B29C 64/165*  (2017.01)
(Continued)

(52) U.S. Cl.
CPC ............ *C09D 11/54* (2013.01); *B29C 64/165* (2017.08); *B33Y 10/00* (2014.12); *B33Y 70/00* (2014.12);
(Continued)

(58) Field of Classification Search
CPC ..... B29C 64/165; C09D 11/102; C09D 11/54; C08L 77/02; C08L 83/04; B33Y 70/00; B33Y 10/00; C08K 5/5415; C08K 3/22; C08K 3/013; C08K 2003/2241; B29K 2083/00

See application file for complete search history.

(56) References Cited

U.S. PATENT DOCUMENTS

2004/0232583 A1   11/2004   Monsheimer et al.
2015/0251247 A1   9/2015    Monsheimer et al.
(Continued)

FOREIGN PATENT DOCUMENTS

WO    WO-2019108201 A1   6/2019

*Primary Examiner* — Monica A Huson
(74) *Attorney, Agent, or Firm* — HP Inc. Patent Department (57) ABSTRACT

A multi-fluid kit for three-dimensional printing can include a fusing agent with water and a radiation absorber, and a detailing agent. The radiation absorber can absorb radiation energy and converts the radiation energy to heat. The detailing agent can include water and from about 0.1 wt % to about 20 wt % organosilanes based on a total weight of the detailing agent, wherein the organosilanes include an organosilane compound with a central silicon having both a water-solubilizing group and multiple hydrolyzable groups attached thereto.

15 Claims, 5 Drawing Sheets

(51) Int. Cl.
  *B33Y 10/00* (2015.01)
  *B33Y 70/00* (2020.01)
  *C08K 5/5415* (2006.01)
  *C09D 11/102* (2014.01)
  *B29K 83/00* (2006.01)

(52) U.S. Cl.
  CPC .......... *C08K 5/5415* (2013.01); *C09D 11/102* (2013.01); *B29K 2083/00* (2013.01)

(56) References Cited

U.S. PATENT DOCUMENTS

| | | |
|---|---|---|
| 2017/0274594 A1 | 9/2017 | Ng et al. |
| 2017/0312983 A1 | 11/2017 | Birecki et al. |
| 2018/0104894 A1 | 4/2018 | Fung et al. |
| 2018/0264720 A1 | 9/2018 | Tamoto et al. |
| 2018/0272600 A1 | 9/2018 | Shaarawi et al. |
| 2019/0030788 A1 | 1/2019 | Erickson et al. |
| 2019/0030799 A1 | 1/2019 | Chen et al. |
| 2019/0091936 A1 | 3/2019 | Fornos et al. |
| 2022/0363923 A1* | 11/2022 | Negri Jimenez ...... B33Y 70/00 |

* cited by examiner

THREE-DIMENSIONAL PRINTING

BACKGROUND

Methods of three-dimensional (3D) digital printing, a type of additive manufacturing, have continued to be developed over the last few decades. However, systems for 3D printing have historically been expensive, though those expenses have been coming down to more affordable levels recently. In general, 3D printing technology can shorten the product development cycle by allowing rapid creation of prototype models for reviewing and testing, and/or can be used for product manufacturing in some instances. There are several commercial sectors, such as aviation and the medical industry, for example, that have benefitted from the ability to rapidly prototype and customize parts, and the industries taking advantage of this technology continue to grow.

DETAILED DESCRIPTION

The present disclosure describes materials kits for three-dimensional (3D) printing, methods of making 3D printed articles, and 3D printing systems. In one example, a materials kit for 3D printing can include a fusing agent and a detailing agent. The fusing agent can include water and a radiation absorber, wherein the radiation absorber absorbs radiation energy and converts the radiation energy to heat. The detailing agent can include water and from about 0.1 wt % to about 20 wt % organosilanes based on a total weight of the detailing agent. The organosilanes include an organosilane compound with a central silicon having both a water-solubilizing group and a multiple hydrolyzable moieties attached thereto. In one example, the organosilane can be a triethoxyorganosilane compound. The water-solubilizing group can include, for example, polyethylene oxide, amine, glycidyl, succinic anhydride, or a combination thereof. In a more specific example, the water-solubilizing group includes a polyethylene oxide urethane. In another example, organosilanes can further include a tetraalkoxyorganosilane compound in addition to the organosilane compound having the water-solubilizing group and multiple hydrolyzable groups attached thereto. The radiation absorber can include, for example, a metal dithiolene complex, carbon black, near-infrared absorbing dye, near-infrared absorbing pigment, metal nanoparticles, conjugated polymer, or a combination thereof. The water can be present in the detailing agent at from about 50 wt % to about 99 wt %. For example, the detailing agent can include from about 60 wt % to about 94 wt % water, from about 5 wt % to about 35 wt % organic cosolvent, and from about 1 wt % to about 10 wt % of the organosilanes, with weight percentages based on a total weight of the detailing agent. The fusing agent can include from about 60 wt % to about 94 wt % water, from about 5 wt % to about 35 wt % organic cosolvent, and from about 1 wt % to about 20 wt % radiation absorber, based on a total weight of the fusing agent.

In another example, a three-dimensional printing kit can include a fusing agent, a detailing agent, and a powder bed material. The fusing agent can include water and a radiation absorber to absorb radiation energy and convert the radiation energy to heat. The detailing agent can include water and from about 0.1 wt % to about 20 wt % organosilanes based on a total weight of the detailing agent. The organosilanes can include an organosilane compound with a central silicon having both a water-solubilizing group and multiple hydrolyzable moieties attached thereto. The powder bed material can include from about 60 wt % to 100 wt % polymeric particles. The organosilanes can be reactive with one another to form polysiloxanes that are chemically independent relative to the polymeric particles. In one example, the polymeric particles can include a polymer selected from polyamide, polyethylene, thermoplastic polyurethane, polypropylene, polyester, polycarbonate, polyether ketone, polyacrylate, polystyrene, wax, or a combination thereof. In another example, the organosilanes can include dialkoxysilanes, trialkoxysilanes, or a combination thereof. The water-solubilizing group can include, for example, a polyethylene oxide urethane.

In another example, a method of making a three-dimensional printed article can include iteratively applying individual build material layers of a powder bed material including polymer particles to a powder bed, and based on a three-dimensional object model, selectively jetting a fusing agent onto individual build material layers, wherein the fusing agent includes water and a radiation absorber. The method can further include, based on the three-dimensional object model, selectively jetting a detailing agent onto individual build material layers laterally at a border between a first area where the powder bed material is contacted by the fusing agent and a second area where the powder bed material is not contacted by the fusing agent. The detailing agent can include water and from about 0.1 wt % to about 20 wt % organosilanes based on a total weight of the detailing agent. The organosilanes can include an organosilane compound with a central silicon having both a water-solubilizing group and multiple hydrolyzable moieties attached thereto. The method can further include exposing the powder bed material to energy to selectively fuse the polymer particles in contact with the radiation absorber to form a fused polymer matrix at individual build material layers. In this example, the organosilanes can form polysiloxanes at the border that are chemically independent relative to the polymeric particles. The elevated temperature can be from about 100° C. to about 250° C., for example.

In addition to the examples described above, including the materials kits, the 3D printing systems, and the methods of manufacturing, features will be described in greater detail below. It is also noted, however, that when discussing the materials kits, the printing system, and/or the methods of manufacturing, these discussions can be considered applicable to the other examples, whether or not they are explicitly discussed in the context of that example. Thus, for example, in discussing a specific organosilane compound related to a materials kit, such disclosure is also relevant to and directly supported in the context of the methods of manufacturing and printing systems described herein, and vice versa.

Multi-Fluid Kit for 3D Printing

Figure 1:
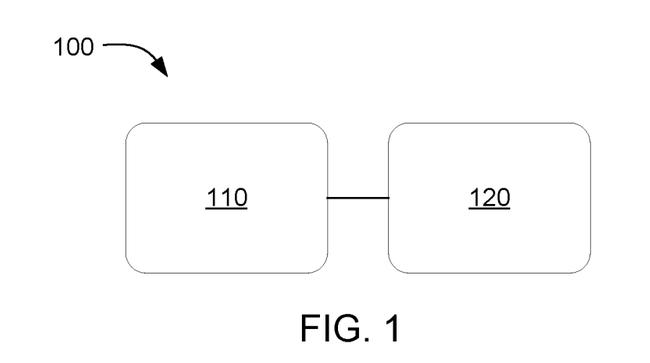
FIG. 1 is a schematic view of an example multi-fluid kit for 3D printing in accordance with the present disclosure.

In accordance with the present disclosure, a multi-fluid kit 100 for 3D printing is shown by example in FIG. 1. In this example, the multi-fluid kid can include a fusing agent 110 and a detailing agent 120. The fusing agent can include water and a radiation absorber that can absorb radiation energy and convert the radiation energy to heat. The detailing agent can include water and organosilanes including an organosilane compound with a central silicon having both a water-solubilizing group and a multiple hydrolyzable moieties attached thereto. The term "water-solubilizing group" refers to the one or two groups attached to the central silicon that are other than the multiple hydrolyzable moieties or groups, e.g., alkoxy groups, halogenated group, etc., that may be involved in becoming linked together by condensation to form the polysiloxanes. The water-solubilizing group can be initially water-soluble, such as a polyethylene oxide-containing group, or can be a group that when placed in a water-based liquid vehicle, can becomes water-soluble by hydrolysis, such as a glycidoxypropyl group, for example. Example water-solubilizing groups may include, for example, polyethylene oxides, amines, glycidyls (epoxides), succinic anhydrides, etc. In further detail, water-solubilizing groups can be considered to be hydrophilic groups in aqueous solution.

Materials Kits for 3D Printing

Figure 2:
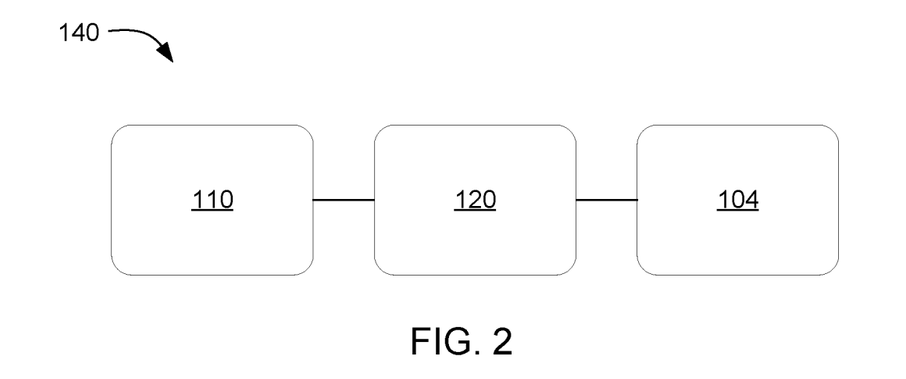
FIG. 2 is a schematic view of a materials kit for 3D printing in accordance with the present disclosure.

In another example, a materials kits 140 for 3D printing is shown by example in FIG. 2. In this example, the materials kits can include build material and multiple fluid agents. More specifically, the materials kit for 3D printing can include a powder bed material 104, a fusing agent 110, and a detailing agent 120. In particular, the fusing agent can be selectively applied to the powder bed material and layers of the powder bed material can be fused to form a 3D printed article. The detailing agent can be applied at or about edges of the 3D printed article as it is being formed to provide good detail at boundaries of the 3D printed article. In some examples, the materials kit for 3D printing can include powder bed material, fusing agent, and detailing agent packaged together, or they can be packaged separately for assembly and use together in a common system. In other examples, the powder bed material can be in the form of a container or bag of loose powder bed material. In still other examples, the powder bed material can be in a cartridge designed to fit in a specific 3D printing system to be distributed in layers as described herein. Similarly, the fusing agent and/or the detailing agent can be packaged for loading into a print cartridge, e.g., in a bottle, of the fusing agent and/or the detailing agent can be packaged within a cartridge designed for use with a specific 3D printing system.

3D Printing Systems

Figure 3:
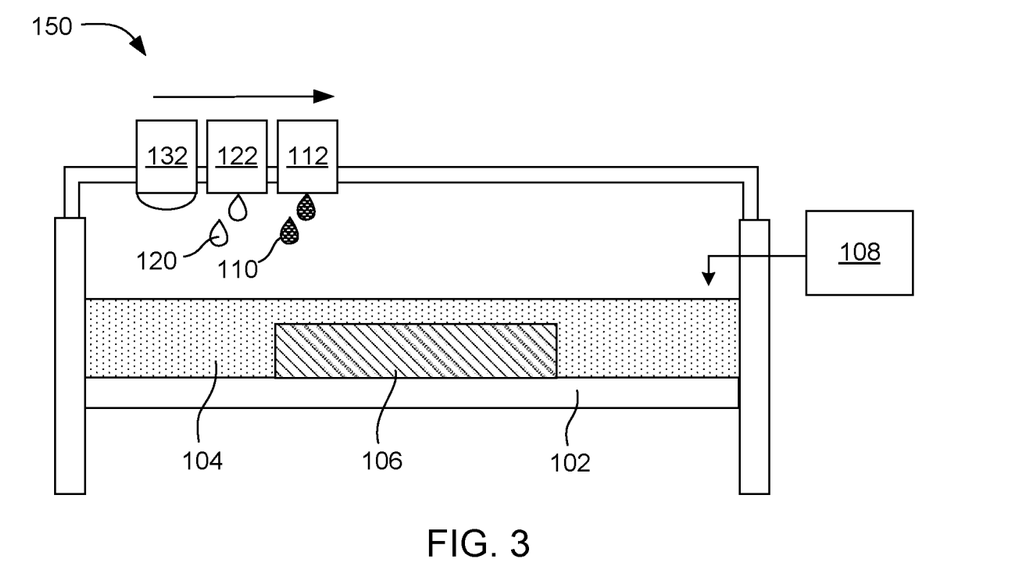
FIG. 3 is a schematic view of an example 3D printing system in accordance with the present disclosure.
Figure 4:
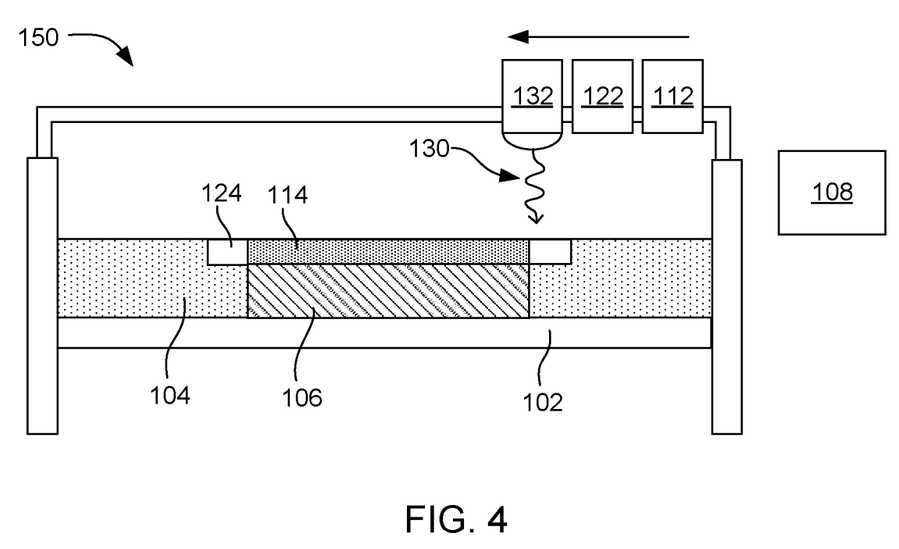
FIG. 4 is another schematic view of the example 3D printing system of FIG. 3 in accordance with the present disclosure.
Figure 5:
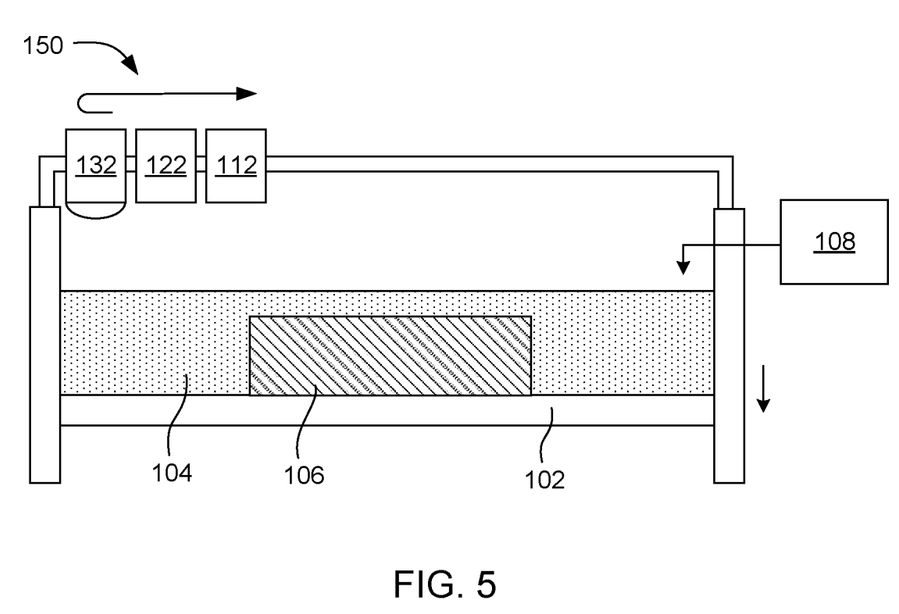
FIG. 5 is another schematic view of the example 3D printing system of FIG. 3 in accordance with the present disclosure.

FIGS. 3-5 illustrate an example 3D printing system 150 in accordance with the present disclosure. More specifically, FIG. 3 and the other FIGS. of this series, show a cross-sectional view of the partially printed article and the powder bed material loaded in an example 3D printer. The 3D printer and the 3D printing system components can include a build platform 102 supporting a powder bed material 104. A partially printed article 106 is shown that includes fused powder bed material. In building the three-dimensional article or part, a layer of fresh build material powder is supplied from a build material supply 108 over the top of the partially printed article. Fusing agent 110 is then applied to the layer of fresh build material from a fusing agent ejector or jet 112. The fusing agent jet can be moveable within the 3D printer so that the fusing agent jet move across the powder bed (of powder bed material) to apply the fusing agent at specific locations based on a 3D object model. Likewise, detailing agent 120, including organosilanes, can be applied to the layer of fresh build material from a detailing agent ejector or jet 122. The fusing agent is typically applied to cause fusion of the powder build material to form the 3D printed article, and the detailing agent is typically applied just outside of the location of the 3D printed article to assist with forming a defined outer surface thereof.

FIG. 4 shows an example 3D printing system 150 after the fusing agent 110 (shown in FIG. 3) and the detailing agent 120 (also shown in FIG. 3) has been jetted onto portions of the fresh powder bed material 104. Thus, the detailing agent applied to the powder build material at location 124 can provide thermal cooling as well as the formation of a polysiloxanes to provide detailing to a surface of the 3D printed article that is formed within the powder bed material. The formation and structure of the polysiloxanes is shown and described by way of example in FIG. 7, in Formulas I and II, as well as in the Examples hereinafter. In further detail, the newest uppermost layer 114 of the 3D article being formed is shown as having been fused using electromagnetic energy 130 emitted from an electromagnetic energy source 132 toward the powder build material 104. For example, fusing occurs at this uppermost layer due to the presence of both the fusing agent as well as due to the application of the electromagnetic energy to the powder bed material where the fusing agent has been applied.

FIG. 5 shows the 3D printing system 150 after fusing newest uppermost layer to form the next iteration of the 3D printed article 106. The 3D printed article represented in this FIG. may be the completed 3D article, or may represent an intermediate structure of the 3D article to which another layer(s) of powder bed material, fusing agent, and electromagnetic energy can be applied to continue building the article.

As used herein, "jet," "eject," "jetting," ejecting," or the like can be used interchangeably, and refers to digital jetting or ejection of various compositional agents described herein. Jetting architecture can include thermal or piezo architecture with printheads with printing orifices or openings suitable for ejection of small droplets of fluid. In some examples, the fluid droplet size can be from about 2 picoliters to about 100 picoliters, from about 2 picoliters to about 50 picoliters from about 2 picoliters to about 40 picoliters, from about 2 picoliters to about 30 picoliters, from about 2 picoliters to about 20 picoliters, from about 2 picoliters to about 10 picoliters, from about 3 picoliters to about 20 picoliters, or from about 3 picoliters to about 10 picoliters, or from about 3 picoliters to about 8 picoliters, etc.

In further detail regarding the electromagnetic energy 130 applied, such energy can be in the form of infrared energy, near-infrared energy, visible light energy, or other wavelength of energy suitable for fusing the powder build material in the presence of the fusing agent. Suitable electromagnetic energy sources 132 can be, for example, in the form of fusing lamps, such as infrared lamps and halogen lamps. The fusing lamp can be a stationary lamp or a moving lamp. For example, the lamp can be mounted on a track to move horizontally across the powder bed (of powder bed material), as shown by example in FIGS. 3-5. Such a fusing lamp can make multiple passes over the powder bed material 104 depending on the amount of exposure determined for use to fuse individual layers or groups of layers. The fusing lamp can irradiate the entire powder bed area with a substantially uniform amount of energy, or can more selectively irradiate the powder bed area. Either way, it is typically the presence of the fusing agent in certain locations within the powder bed area that has more of an impact on whether a portion of the powder bed material becomes fused. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the powder bed material including the composite fiber particles with the fusing agent printed thereon, while the unprinted powder bed material does not absorb as much light and remain at a lower temperature.

In further detail regarding the example 3D printing system shown in FIGS. 3-5, in some examples, the 3D printing system can also include preheaters for preheating the powder bed material including the composite fiber particles to a temperature near the fusing temperature. In one example, the system can include a print bed heater (not shown) to heat the build platform 102. In other examples, there can be overhead heaters that apply heat to the powder build material from above, such as radiant heaters, forced air heaters, etc. In some examples, the print bed heater and/or an overhead heater, for example, can apply heat to the powder bed material at a temperature from about 50° C. to about 250° C., for example. In still other examples, the build material supply 108 can also include a supply heater to preheat the powder build material supply prior to spreading a layer of powder bed material on the build platform or a previously applied layer of powder bed material, for example. The supply heater can heat the supply to a temperature from about 80° C. to about 140° C., for example. With these temperatures as guidelines, it is noted that the preheat temperature(s) used can depend on the specific polymeric particulates used in the powder bed material. Keeping the powder bed material near its fusing temperature may allow for less electromagnetic energy to be applied to bring the powder bed material (in contact with fusing agent) to its fusing temperature, for example. In some other examples, various heating apparatuses, such as the print bed heater, can also be used to anneal the 3D printed article after formation.

Depending on the amount of radiation absorber present in the powder bed material, the absorbance of the radiation absorber, the preheat temperature, and the fusing temperature of the specific polymeric particles present, an appropriate amount of radiation can be supplied from the electromagnetic energy source 132. In some examples, the fusing lamp can irradiate individual layers from about 0.1 seconds to about 10 seconds per pass. In further examples, the fusing lamp can move across the powder bed at a rate of about 1 inch per second to about 60 inches per second to fuse the various layers. In still further examples, the fusing lamp can move across the powder bed at a rate of about 5 inches per second to about 20 inches per second. The energy applied to the powder bed material can be pulsed energy, or continuous energy.

Methods of Making 3D Printed Articles

In further detail regarding the methods of making 3D printed articles, in addition to the details provided previously with respect to the multi-fluid kits, the materials kits, and the 3D printing systems, the 3D printing can be carried out by jetting or ejecting a fusing agent onto layers of the powder build material described herein, along with fusing the powder build material using electromagnetic energy. Detailing agent can be ejected as well at certain locations to assist with accurately defining the 3D article being formed.

Figure 6:
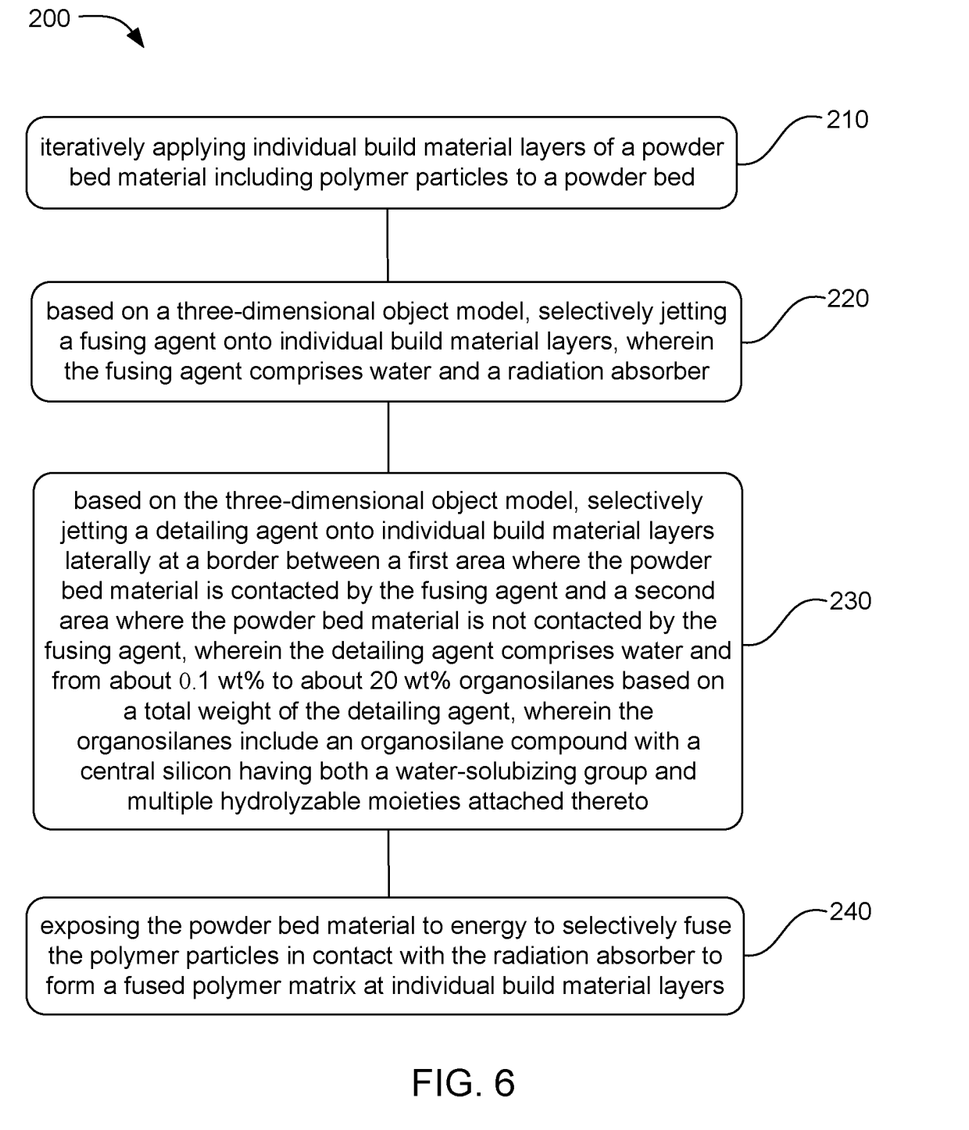
FIG. 6 is a flowchart illustrating an example method of making a 3D printed article in accordance with the present disclosure.

In accordance with the, FIG. 6 is a flowchart illustrating one example method 200 of making a 3D printed article. The method in this example includes iteratively applying 210 individual build material layers of a powder bed material including polymer particles to a powder bed, and based on a three-dimensional object model, selectively 220 jetting a fusing agent onto individual build material layers, wherein the fusing agent includes water and a radiation absorber. The method can further include, based on the three-dimensional object model, selectively jetting 230 a detailing agent onto individual build material layers laterally at a border between a first area where the powder bed material is contacted by the fusing agent and a second area where the powder bed material is not contacted by the fusing agent. The detailing agent can include water and from about 0.1 wt % to about 20 wt % organosilanes based on a total weight of the detailing agent. The organosilanes can include an organosilane compound with a central silicon having both a water-solubilizing group and multiple hydrolyzable moieties attached thereto. The method can further include exposing 240 the powder bed material to energy to selectively fuse the polymer particles in contact with the radiation absorber to form a fused polymer matrix at individual build material layers. In this example, the organosilanes can form polysiloxanes at the border that are chemically independent relative to the polymeric particles. The elevated temperature can be from about 100° C. to about 250° C., for example.

As mentioned above, the 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area where the fusing agent is to be applied, as well as the location of application of detailing agent. Other information may also be included, such as structures to be formed of additional different materials or color data for printing the article with various colors at different locations on the article. The 3D object model may also include features or materials specifically related to jetting agents on layers of powder bed material, such as the desired amount of agent to be applied to a given area. This information may be in the form of a droplet saturation, for example, which can instruct a 3D printing system to jet a certain number of droplets of agent into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of powder bed material can be spread on a bed to form a powder bed. At the beginning of the process, the powder bed can be empty because no powder bed material have been spread at that point. For the first layer, the powder bed material can be spread onto an empty build platform. The build platform can be a flat surface made of a material sufficient to withstand the heating conditions of the 3D printing process, such as a metal. Applying individual layers of powder bed material to a powder bed support can include spreading powder bed material onto the empty build platform for the first layer, and/or can also include spreading layers of powder bed material over the loose particles and fused layers beneath the new layer of powder bed material. In some examples, a number of initial layers of powder bed material can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A print head, such as an inkjet print head, can then be used to print a fusing agent including a radiation absorber over portions of the powder bed corresponding to a thin layer of the 3D article to be formed. Then, the bed can be exposed to electromagnetic energy, e.g., typically the entire bed. The electromagnetic energy can include visible light energy, infrared energy, near-infrared energy, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of powder bed material can be spread over the powder bed and the process can be repeated to form additional layers until a complete 3D article is printed.

Fusing Agents

The fusing agent can include water and a radiation absorber that can absorb radiation energy and convert the radiation energy to heat. Example radiation absorbers include, for example, a metal dithiolene complex, carbon black, glass fiber, titanium dioxide, clay, mica, talc, barium sulfate, calcium carbonate, near-infrared absorbing dye, near-infrared absorbing pigment, metal nanoparticles, conjugated polymer, or a combination thereof. The radiation absorber can be colored or colorless. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbers described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 20 wt %. In another example, the concentration can be from about 0.5 wt % to about 15 wt %. In yet another example, the concentration can be from about 1 wt % to about 10 wt %. In a particular example, the concentration can be from about 0.5 wt % to about 2 wt %. In one specific example, the fusing agent can include from about 60 wt % to about 94 wt % water, from about 5 wt % to about 35 wt % organic cosolvent, and from about 1 wt % to about 20 wt % radiation absorber, based on a total weight of the detailing agent.

Detailing Agent

Figure 7:
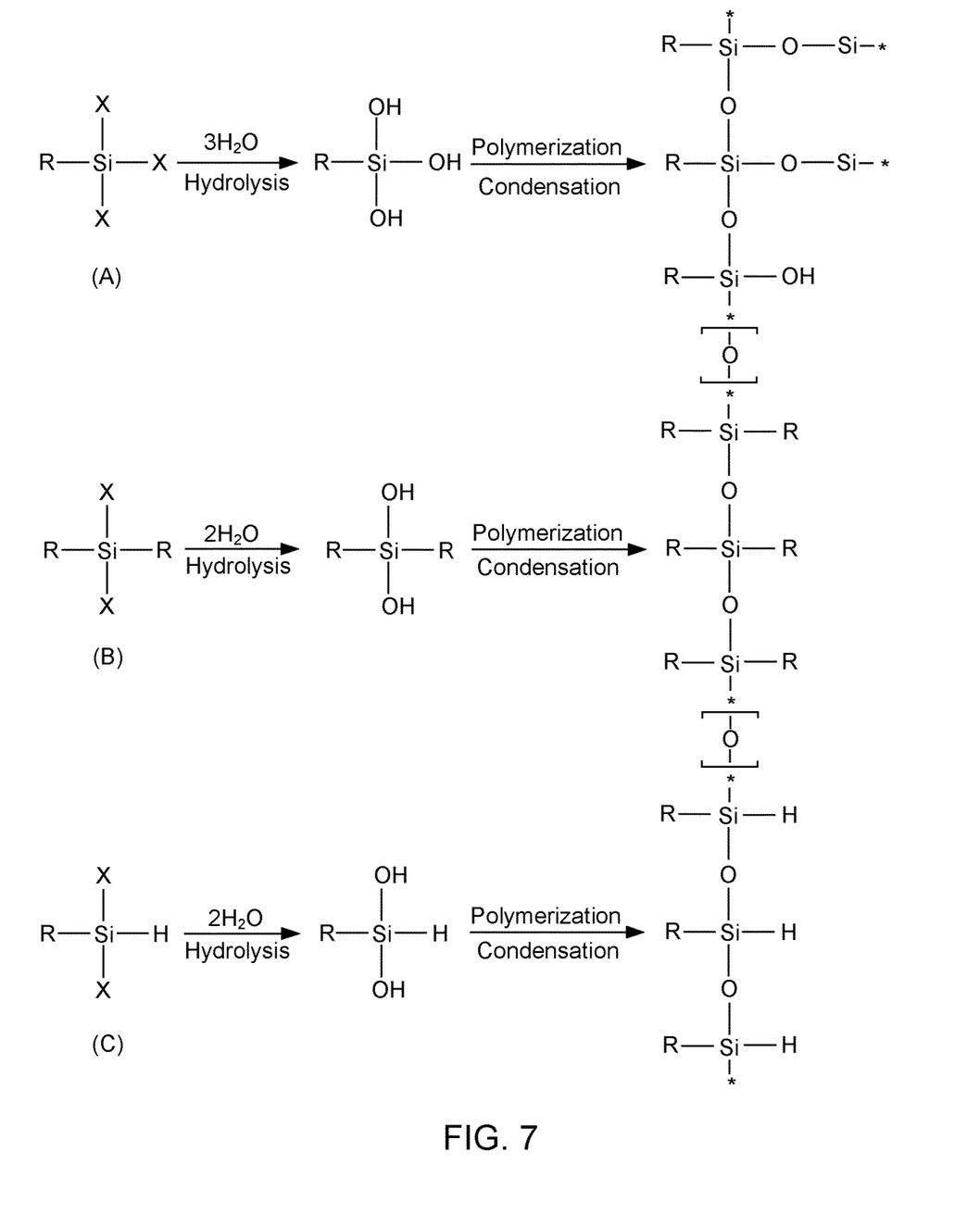
FIG. 7 illustrates multiple example organosilane compounds that can be included in a detailing agent, as well as multiple example polysiloxanes that can be formed in a powder bed material, in accordance with the present disclosure.

The detailing agent can include water and organosilanes. The organosilanes can include an organosilane compound with a central silicon having both a water-solubilizing group and a multiple hydrolyzable moieties attached thereto. As there are four positions available on a central silicon, there can be one or two water-soluble moieties, and there can be two or three hydrolyzable moieties. Three examples of organosilane compounds are shown in FIG. 7 by way of example, where R represents water-soluble moieties and X represents hydrolyzable moieties. For example, organosilane compound (A) includes one water-solubilizing group and three hydrolyzable moieties; organosilane (B) includes two water-soluble moieties and two hydrolyzable moieties; and organosilane (C) includes one water-solubilizing group and two hydrolyzable moieties. Organosilane (C) also includes hydrogen at one of the four positions on the central silicon atom. In this example, the water-solubilizing group, represented by R, can independently be any water-solubilizing group that provides hydrophilic properties to the organosilane compound in solution, and which has low reactivity with other organosilane compounds when in solution within the detailing agent, e.g., low enough reactivity to remain stable while in a fluid state prior to ejection from a fluidjet printhead or other ejector. Though not shown in FIG. 7, in some examples, there can be additional organosilane compounds present, such as tetraalkoxysilanes, for example. If present, they can be included at from about 0.01 wt % to about 5 wt %, from about 0.05 wt % to about 3.5 wt %, from about 0.1 wt % to about 2 wt %, or from about 0.01 wt % to about 1 wt %, based on a total weight of the detailing agent. In some examples, there are no tetraalkoxysilanes present. Notably, though the various polysiloxanes are shown as linked together with a siloxane group with the oxygen shown in brackets, e.g., [—O—], this is provided by way of example, and the linking polymer therebetween can be longer, or the various structures formed can be unlinked, or there may not be all of the structures shown at (A)-(C) present in a common formulation. These structures are provided by way of example to illustrate various possible combinations and structures that can be formed.

Example water-solubilizing groups, or R groups, can include, for example, polyethylene oxides, amines, glycidyls (epoxides), succinic anhydrides, etc. It is noted that the water-solubilizing group, or R group, can include a water soluble moiety that is coupled to the central silicon atom through a linker, which can include, for example, a short alkyl chain, e.g., C1-C5 straight chained or branched alkyl group, and/or other linking groups, such as urethane, as an example. Other water-solubilizing groups can likewise be used. Example hydrolyzable groups, or X groups, can include alkoxy groups, such as methoxy or ethoxy, or halogens, such as chloride or bromide. Other hydrolyzable groups can likewise be used.

Two specific examples of organosilane compounds that can be used in accordance with the present disclosure are shown as Formulas I and II below.

N-(triethoxysilylpropyl)-O-polyethylene oxide urethane

Formula I is an alkylamine water-solubilizing group, which more specifically includes an amine water-soluble moiety and a propyl linker. This particular structure can be referred to more specifically as an aminopropyltriethoxysilane. This specific organosilane can provide a detailing agent with a relatively high pH, e.g., about pH 11 to about 12. and thus, can be used at a higher pH level or can be buffered to achieve a lower pH level, or formulated in another way to be useful for a given detailing agent application. For systems where a lower pH is desired, Formula II includes a polyethylene oxide water-solubilizing group where n can be from 3 to 12, from 4 to 12, from 4 to 10, from 4 to 8, from 5 to 8, from 6 to 8, or from 4 to 6, for example. This organosilane can be particularly useful at about pH 6 to about pH 8.5, about pH 6.5 to about pH 8, or about pH 6.5 to about pH 7.5, for example. More specifically, Formula II includes a polyethylene oxide water-soluble moiety with a propyl urethane linker. In one example, Formula II can be referred to as an N-(triethoxysilylpropyl)-O-polyethylene oxide urethane. Other water soluble moieties, other linkers (other than propyl, other than urethane, etc.), can likewise be used. Furthermore, in these particular examples, Formulas I and II depict triethoxysilanes, but it is understood that either could likewise be diethoxysilanes, trimethoxysilanes, dimethoxysilanes, trichlorosilanes, dichlorosilanes, tribromosilanes, dibromosilanes, etc. One reason triethoxysilanes are shown and described is because they may exhibit a slow enough rate of hydrolysis that, coupled with the water-solubilizing group, the organosilane can remain effectively in solution as a detailing agent, but can be react quickly enough once printed into the power bed material to be effective in forming the polysiloxane barrier at a boundary of the 3D printed article. Methoxysilanes react more quickly and halosiloxanes, for example, may not be as environmentally friendly as alkoxysilanes.

Other example organosilanes that can be used are provide below as Formulas III-XIV. It is noted that various dialkoxysilanes and trialkoxysilanes below are provide by way of example. As such, example ethoxy moieties can be methoxy and/or halogenenated moieties, and vice versa. Trialkoxy can be dialkoxy or dihalogenated silanes, and vice versa, etc.

3-aminopropyltriethoxysilane

Formula I 3-aminopropyltrimethoxysilane

Formula III

Formula IV

N-(2-aminoethyl)-3-aminopropyltrimethoxysilane

Formula V

N-(2-aminoethyl)-3-aminopropylmethyldimethoxysilane

Formula VI

3-(N,N-dimethylaminopropyl)aminopropylmethyldimethoxysilane

Formula VII

N-(2-aminoethyl)-3-aminoisobutylethyldimethoxysilane

Formula VIII

N-(6-aminohexyl)aminopropyltrimethoxysilane

Formula IX

N-(2-aminoethyl)-3-aminopropyltriethoxysilane

Formula X

3-aminopropylmethyldiethoxysilane

Formula XI

(3-trimethoxysilylpropyl)diethylenetriamine

Formula XII

(3-glycidoxypropyl)trimethoxysilane

Formula XIII 3-(trimethoxylilylpropyl)methylphosphonate

Formula XIV (3-triethoxysilyl)propylsuccinic anhydride

Referring once again to FIG. 7, as shown, a hydrolysis reaction can introduce hydroxyl groups to the organosilane compound, which can then be polymerized or condensed to form any of a number of oligomeric or polymeric siloxanes, where are referred to herein collective as "polysiloxanes." The rate at which hydrolysis occurs upon ejecting into a powder bed material as part of a detailing agent can be dependent on the number and structure of hydrolyzable groups and to some extent, on the structure of the water-solubilizing group(s). Application of heat to the powder bed can, for example, promote the formation of self-polymerized polysiloxanes structures such as that shown by way of example in FIG. 7. pH modification when jetted into a layer of the powder bed material can also facilitate formation of the polysiloxanes.

In accordance with examples of the present disclosure, the powder bed material, and particularly the polymer particles used in the powder bed material, can be selected or formulated to avoid surface hydroxyl groups. In one example, the powder bed material is devoid of surface hydroxyl groups. In another example, if some surface hydroxyl groups are present, they can be presented at a deminimis concentration, e.g., due to impurities or polymers with hydroxyl end groups, but not throughout the polymer chain, etc., so that the polysiloxanes do not substantially interact or bond with the 3D article being printed significantly enough that the polysiloxanes cannot be easily removed by wiping, washing, or other simple procedure. In some examples, a more vigorous post-processing step can occur, such as sand blasting or other similar methodology. Thus, in the absence (or substantial absence) of surface hydroxyl-containing powder bed material, self-condensation of silanols are free to produce the polysiloxanes, providing a polymeric detailing compound to form that is operable in a thermally cooling detailing agent (due to the water and/or other solvnets) as well as by creating a physical barrier at a surface of the 3D printed article from the polysiloxanes that are formed. In one example of the present disclosure, the use of trialkoxysilanes in particular as the monomeric unit with a single water-solubilizing group, or R group, as shown at (A) in FIG. 7, hydrolysis can be slowed to avoid appreciable condensation in the fluid. Once in the aqueous liquid vehicle, the hydrolyzable groups may be deminimis, but the hydrolysis rate can be a gatekeeper to a second rate of condensation. By slowing hydrolysis with these considerations, some printability issues can be avoided in some specific examples. The formation of some concentration of polysiloxanes in solution is acceptable, however, provided the polysiloxanes can remain in solution, for example.

When the detailing agent is formulated as an aqueous fluid, hydrolysis can be controlled to prevent early formation of the polysiloxanes by selecting a water-solubilizing group(s) that provides for keeping the organosilane in solution prior to ejection into the powder bed material layer as a detailing agent. For example, buffering to a relatively neutral pH, e.g., from about pH 6 to about pH 8 or about pH 6.5 to about pH 7.5, is one approach to keeping the organosilanes (or any polysiloxanes formed in solution) appropriately solubilized.

In one example, the organosilanes can be present in the detailing agent at from about 1 wt % to about 20 wt %, from about 2 wt % to about 15 wt %, or from about 2 wt % to about 10 wt %, for example. The water can be present in the detailing agent at from about 50 wt % to about 99 wt %, as an example. For example, the detailing agent can include from about 60 wt % to about 94 wt % water, from about 5 wt % to about 35 wt % organic cosolvent, and from about 1 wt % to about 10 wt % of the organosilanes, with weight percentages based on a total weight of the detailing agent.

The water can provide cooling of the powder bed material, and thus contribute to a thermal detailing function. The organosilanes, on the other hand, due to the presence of the multiple hydrolyzable moieties attached to the central silicon atom, can be reactive with one another to form polysiloxanes. When the polymeric particles of the powder build material are selected or formulated such that there are no surface hydroxyls, or if present, at a deminimis surface concentration of hydroxyl groups, so that the polysiloxanes formed can remain substantially chemically independent relative to the polymeric particles. The term "chemically independent" does not preclude all surface polymeric particle surface reactions with the organosilanes, as there may be impurities or other reasons that there are deminimis concentrations of surface hydroxyls present within the powder build material. By "chemically independent," what is meant is that whatever bonding may occur at a surface of the printed 3D article, the bonding is insufficient to permanently incorporate the polysiloxanes formed onto a surface of the article. In other words, the polysiloxanes form within the powder at a surface of the printed 3D article to provide detailing properties to the article without becoming part of the 3D article that is being printed.

Powder Bed Material

The powder build material 104, as mentioned, can include from about 60 wt % to 100 wt %, from about 80 wt % to 100 wt %, from about 90 wt % to 100 wt %, or from about 99 wt % to 100 wt % polymeric particles. In some examples, the polymeric build material can be at about 100 wt % polymer particles. Examples of polymeric particles that can be used include one or multiple species of the following classes of polymers, namely polyamides, polyethylenes, thermoplastic polyurethanes, polypropylenes, polyesters, polycarbonates, polyether ketones, polyacrylates, polymethacryaltes, polystyrenes, polytetrafluroethylenes, polyvinyl chlorides, polyacetals, waxes, polybutadienes, poly(C2-C4 terephthalates)s, e.g., polyethylene terephthalate (PET), acrylonitrile butadiene styrenes, polyacrylamides, polyacrylonitrile, poly(phenyl sulfide)s, or a combination thereof. The selection of the polymer can take into consideration whether there may be surface hydroxyls present, and if so, that the concentration be low enough that it does not impact the function of the detailing agent to remain substantially separate relative to the 3D printed article. In some examples, the polymer particles can be semi-crystalline thermoplastic materials with a relatively wide temperature differential between the melting point and re-crystallization, e.g., greater than 5° C. Some more specific examples of the polymeric build material in the form of powders or particulates can include polyamides (PAs or nylons), such as nylon 6 (PA 6), nylon 8 (PA 8), nylon 9 (PA 9), nylon 11 (PA 11), nylon 12 (PA 12), nylon 66 (PA 66), nylon 612 (PA 612), nylon 812 (PA 812), and other polyamides. Core shell polymer particles of these materials may also be used. In one specific example, the particulate polymer can be a polyamide, such as nylon 12, which can have a melting point from about 175° C. to about 200° C.

More generally, the polymeric build material can have a melting point ranging from about 90° C. to about 350° C., from about 100° C. to about 300° C., from about 125° C. to about 275° C., from about 150° C. to about 250° C., etc. As examples, the polymeric build material can be a polyamide having a melting point of about 170° C. to about 190° C., or a thermal plastic polyurethane having a melting point ranging from about 100° C. to about 165° C. In further detail, the polymeric build material can be made up of similarly sized particles that are relatively homogenous in size or can have a wider particle distribution profile. The term "size" or "average particle size" is used herein to describe diameter or average diameter, which may vary, depending upon the morphology of the individual particle. In an example, the respective particle can have a morphology that is substantially spherical. A substantially spherical particle (e.g., spherical or near-spherical) has a sphericity of >0.84. Thus, any individual particles having a sphericity of <0.84 are considered non-spherical (irregularly shaped). The particle size of the substantially spherical particle may be provided by its—diameter, and the particle size of a non-spherical particle may be provided by its average diameter (i.e., the average of multiple dimensions across the particle) or by an effective diameter, which is the diameter of a sphere with the same mass and density as the non-spherical particle. In accordance with this, the average particle size can be from about 20 μm to about 150 μm, from about 50 μm to about 125 μm, or from about 60 μm to about 100 μm.

It is to be understood that the polymeric build material may include, in addition to the polymer particles, up to about 40 wt %, up to about 20 wt %, up to about 10 wt %, up to about 1 wt %, etc., of other components, such as a charging agent, a flow aid, filler, etc., or combinations thereof. Selection of these other components can also be selected to avoid, to some extent surface hydroxyl groups. Charging agent(s), for example, may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), from Clariant Int. Ltd. In an example, if charging agent(s) is added, it can be added in an amount ranging from greater than 0 wt % to about 10 wt % based upon the total wt % of the polymeric build material. Flow aid(s) may be added to enhance the coating flowability of the polymeric build material. Flow aid(s) may be particularly desirable when the particles of the polymeric build material are on the smaller end of the particle size range. The flow aid can enhance the flowability of the polymeric build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, if flow aid is included, it can be added in an amount ranging from greater than 0 wt % to about 10 wt %, based upon the total wt % of the polymeric build material.

Liquid Vehicles

The components of the above described fluid agents, e.g., fusing agents or detailing agents, can be selected to give the respective fluid agents good fluid jetting performance and the ability to fuse the polymer bed material or provide a more refined 3D article edge, respectively. Thus, these fluid agents can include a liquid vehicle along with the compound or compounds used to carry out these functions. In some instances, the liquid vehicle component(s) contribute to the function of the active compound present in the composition. For example, with respect to detailing agents, the presence of a predominant amount of water, e.g., greater than about 50 wt %, can contribute to cooling at or around the borders of the 3D printed article, which contributes to providing good object detail. Likewise, a solvent may be selected that provides a plasticizing effect to a fusing agent, and thus, assists with the fusing function of the radiation absorber present in the detailing agent. Thus, liquid vehicle components can be selected accordingly, in some examples.

In further detail, in either type of fluid, e.g., fusing agent or detailing agent, or in some other fluid that may be present in a fluid set, e.g., an ink to add color or whitening to a printed part, the various liquid vehicle formulations can include water, and in some examples, organic co-solvent. In one example, if the liquid vehicle is an aqueous liquid vehicle for use with thermal ejectors, there can be a predominant amount of water. Regardless, liquid vehicles can be formulated as part of fusing agents and/or detailing agents (or some of ejectable fluid) with from about 30 wt % to about 99 wt %, from about 50 wt % water to about 99 wt % water, from about 50 wt % to about 97 wt % from about 60 wt % to about 97 wt %, from about 70 wt % to about 97 wt %, or from about 70 wt % to about 95 wt %, for example. In further detail, co-solvent can also be included in some examples, and can be present in total at from about 1 wt % to about 48 wt %, about 2 wt % to about 40 wt %, about 4 wt % to about 30 wt %, or about 5 wt % to about 20 wt %, for example. In certain examples, a high boiling point co-solvent can be included in the various fluid agents. The high boiling point co-solvent can be an organic co-solvent that boils at a temperature higher than the temperature of the powder bed during printing. The high boiling point co-solvent can be defined as having a boiling point above about 250° C. In further detail, the high boiling point co-solvent can be present in the various fluid agents at a concentration from about 0.5 wt % to about 5 wt %, from about 1 wt % to about 4 wt %, or from about 1.5 wt % to about 3 wt %. Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Non-ionic, cationic, and/or anionic surfactant can likewise be included in some examples ranging from about 0.01 wt % to about 20 wt %. The surfactant can alternatively be present in an amount from about 0.01 wt % to about 10 wt %, about 0.1 wt % to about 5 wt %, about 1 wt % to about 5 wt %, from 1 wt % to 4 wt %, or from 0.1 wt % to 3 wt %, for example. Example surfactant that can be used include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Other suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate. The liquid vehicle can include dispersants, in some examples, in an amount from about 0.1 wt % to about 5 wt %, about 0.3 wt % to about 3 wt %, or from 0.5 wt % to about 2 wt %. Other components that may be included can be biocides, viscosity modifiers, materials for pH adjustment, sequestering agents, preservatives, or the like. For example, consistent with the formulations of this disclosure, as mentioned, various other additives can be employed to enhance certain properties of the fluid agents for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof. Sequestering agents, such as EDTA (ethylene diamine tetra acetic acid), may be included to eliminate the deleterious effects of heavy metal impurities, and buffer solutions may be used to control the pH of the fluid agent. From about 0.01 wt % to about 2 wt %, for example, can be used. Viscosity modifiers and buffers may also be present, as well as other additives to modify properties of the agent, e.g., fusing agent and/or detailing agent, etc., as desired. Such additives can be present at from about 0.01 wt % to about 20 wt %.

It is noted that in some examples, the fusing agent and/or detailing agent may include active compounds that are highly water-dispersible or water-soluble, and thus, there may be examples where there is little or no organic co-solvent included with the water-based liquid vehicle. Thus, in some examples, fluid agents can be substantially free of organic co-solvent, surfactant, or other organic compounds. As mentioned, however, in other examples, co-solvent can be used to help disperse other various active compounds, enhance the jetting properties of the respective fluid agents, or provide some other function. In still further examples, there can be fluid agents that are non-aqueous.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are exemplary or illustrative of the application of the principles of the presented materials kits and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be acceptable examples.

Example 1—Preparation of Multi-Fluid Kits for 3D Printing

A fusing agent formulation was prepared in accordance with Table 1, as follows:

TABLE 1

| Fusing Agent Formulation (FA) | |
|---|---|
| Ingredient | Concentration (wt %) |
| Near-IR Radiation Absorber | 5 |
| Organic Co-Solvent | 27 |
| Surfactant | 1.28 |
| Biocide | 0.35 |
| Buffer | 0.1 |
| Water | Balance |

For comparison, two detailing agent formulations were prepared in accordance with Tables 2A, 2B, and 3, as follows:

TABLE 2A

| Organosilane-containing Detailing Agent Formulation 1 (DA1) | |
|---|---|
| Ingredient | Concentration (wt %) |
| Triethoxy polyethylene oxide urethane | 5 |
| Organic Co-Solvent | 19 |
| Surfactant | 1.37 |
| Biocide | 0.25 |
| Buffer | 0.1 |
| Water | Balance |

TABLE 2B

| Organosilane-containing Detailing Agent Formulation 2 (DA2) | |
|---|---|
| Ingredient | Concentration (wt %) |
| Triethoxy polyethylene oxide urethane | 7.5 |
| Organic Co-Solvent | 19 |
| Surfactant | 1.37 |
| Biocide | 0.25 |
| Buffer | 0.1 |
| Water | Balance |

TABLE 3

| Comparative Detailing Agent Formulation (DA3) | |
|---|---|
| Ingredient | Concentration (wt %) |
| Organic Co-Solvent | 4 |
| Surfactant | 1.85 |
| Biocide | 0.32 |
| Buffer | 0.1 |
| Water | Balance |

Example 2—Powder Bed Material

A powder bed material was prepared that included 100 wt % polyamide-12 (PA-12 or Nylon-12) particles having a 1:1 spherical morphology. A polyamide-12 was also prepared using the same polyamide-12 particles at 98 wt % in the powder bed material formulation, with 2 wt % titanium oxide as a whitener.

Example 3—Thermal Printhead Decap Performance of Detailing Agent with Low Organic Solvent Content To determine whether detailing agents containing organosilanes would be acceptably printable from a thermal inkjet printhead, detailing agent formulations were prepared which contained varying the concentration of the 3-(triethoxysilylpropyl)polyethylene oxide urethane (modifying the water content proportionally). The formulations evaluated were for initial screening for decap performance, so the organic solvent content was lower than that shown in Tables 2A and 2B, which provided a greater decap challenge for the organosilane evaluated (it was found increasing the organic solvent content better decap performance with these materials).

Decap performance testing was conducted by loading the detailing agent formulations in an inkjet print cartridge with a thermal inkjet printhead and then evaluated for decap performance. "Decap" refers to the ability of a formulation to readily eject from a print head upon prolonged exposure to air. For example, decap can refer to the amount of time that a print head may be left uncapped before the printer nozzle no longer fires properly, potentially because of clogging or plugging, e.g., 5 second decap, 60 second decap, 5 minute decap, 15 minute decap, 1 hour decap, etc. The longer the decap time, the better the decap performance. The data collected is provided in Table 4, which confirms the acceptable printability with respect to decap performance using thermal inkjet architecture.

TABLE 4

Decap Performance of Detailing Agent

| Wt % Organosilanes | Decap (second) |
| --- | --- |
| 1 | 16 |
| 2.5 | 16 |
| 5 | 8 |
| 7.5 | 4 |

Note -
by increasing the organic solvent concentration to that shown in Tables 2A and 2B, the decap performance was further enhanced.

Example 4—Comparison of Detailing Agent Performance

A computer 3D object model and a 3D printed similar to that shown schematically in FIGS. 3-5 was used to prepare multiple diagnostic flat 3D articles. One diagnostic article was a "gap checker," which included a 0.3 cm base with 0.9 cm protrusions structures with a gap therebetween. Gap checkers was printed to determine how much gap clearance could be achieved with the various detailing agents. The other diagnostic article was a hole-containing plate, or "holey plate" having a thickness of about 0.5 cm. The holey plate was targeted to have varying sized small holes (unprinted with fusing agent, but printed with detailing agent) remaining through the thickness of the 3D article to evaluate the performance of the detailing agents described herein. The hole sizes were targeted at various diameter profiles, e.g., ranging from 0.1 mm to 0.5 mm, or set at 4 mm, or ranging from 0.1 mm to 2.41 mm, etc., depending on the specific test being conducted. The powder bed material used for this example was the 100 wt % polyamide-12 powder, and the fusing agent used was that set forth in Example 1, Table 1. Two different detailing agents set forth in Example 1, Tables 2 (DA2) and 3 (DA3) were used for comparison. Other than the selection of detailing agent, the printing parameters were identical.

A gap checker with a gap range from 0.1 mm to 0.5 mm was used to evaluate clearance provided by the different types of detailing agent, namely DA1 and DA2, which included 5 wt % and 7.5 wt % polysiloxanes, respectively, and DA3, which was the comparative detailing agent that did not included polysiloxanes. To account for uniformity of the equipment, the same gap checker was prepared a second time, but rotated at 180 degrees. In this example, DA1 and DA2 were both able to repeatably clear the 0.2 mm or 0.3 mm gaps, depending on the orientation of the gap checker being printed relative to the powder bed. On the other hand, DA3 (the comparative) was only able to clear 0.4 mm or 0.5 mm gaps, depending on orientation of the gap checker being printed.

Figure 8:
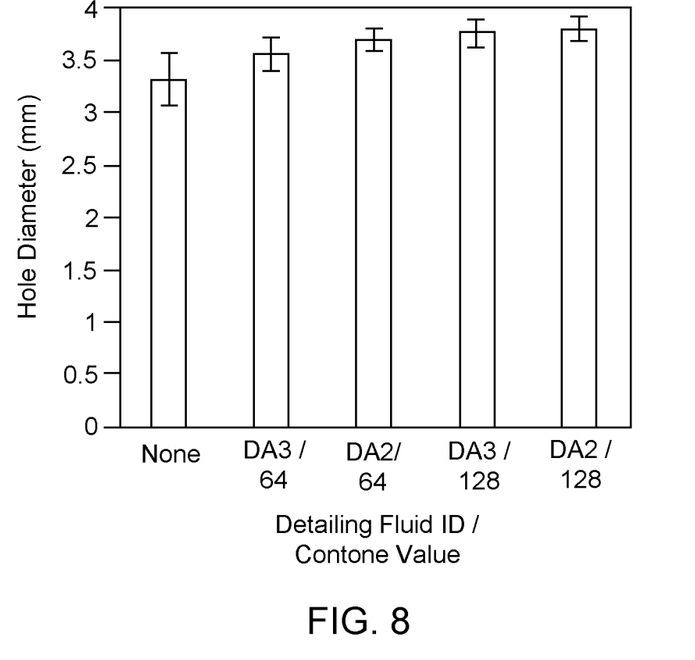
FIG. 8 is a graph depicting an example detailing agent clearance performance comparison in accordance with the present disclosure.

To further evaluate the detail agent formulations, a holey plate was printed using (a) no detailing agent, (b) DA2, or (c) DA3. When detailing agent was used, the contone was applied at either 64 (lower level of detailing agent) or at 128 (higher level of detailing agent). In this example, the holey plate exclusively targeted 4 mm holes. The plots were printed in triplicate and the various holes were measured in triplicate. Thus, the closer the hole size to 4 mm, the better the result, indicating a more accurate hole size being printed. The results are provided by way of example in FIG. 8, which shows that the presence of the polysiloxanes printed a higher contone levels produced the best result, but even at lower contone levels, the polysiloxanes performed close to as well as the comparative detailing agent (DA3) printed at the higher contone level.

Figure 9:
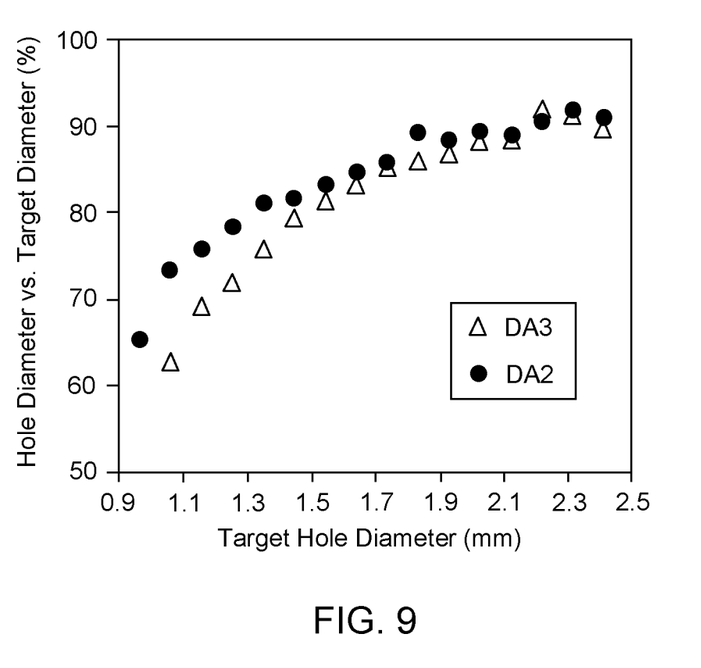
FIG. 9 is a graph depicting an example detailing agent clearance performance comparison in accordance with the present disclosure.

In another example, another holey plate was prepared having sixteen (16) holes ranging from 0.1 mm to 2.41 mm to measure hole clearing performance of DA2 compared to DA3. Again, the plot was printed and rotated 180 degrees in the bed to account for non-uniformity. In the graph shown in FIG. 9, the average of the two runs is plotted, which shows that the presence of the polysiloxanes in the detailing agent provided more accurate features than the control. It is noted that even more significant detailing (compared to the target size) became apparent as the holes (or features) became smaller. Notably, the clearance maximum for DA2 was shown to be about 0.96 mm, while DA3 was unable to clear at this size.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A multi-fluid kit for three-dimensional printing, comprising:
    a fusing agent comprising water and a radiation absorber, wherein the radiation absorber absorbs radiation energy and converts the radiation energy to heat; and
    a detailing agent comprising water and from about 0.1 wt % to about 20 wt % of organosilanes based on a total weight of the detailing agent, wherein the organosilanes include an organosilane compound with a central silicon having both a water-solubilizing group and multiple hydrolyzable groups attached to the central silicon.

2. The multi-fluid kit of claim 1, wherein the organosilane is a triethoxyorganosilane compound.

3. The multi-fluid kit of claim 1, wherein the water-solubilizing group is selected from the group consisting of polyethylene oxide, amine, glycidyl, succinic anhydride, and a combination thereof.

4. The multi-fluid kit of claim 1, wherein the water-solubilizing group is a polyethylene oxide urethane.

5. The multi-fluid kit of claim 1, wherein the organosilanes further include a tetraalkoxyorganosilane compound in addition to the organosilane compound having the water-solubilizing group and multiple hydrolyzable groups attached thereto.

6. The multi-fluid kit of claim 1, wherein the radiation absorber is selected from the group consisting of a metal dithiolene complex, carbon black, near-infrared absorbing dye, near-infrared absorbing pigment, metal nanoparticles, conjugated polymer, and a combination thereof.

7. The multi-fluid kit of claim 1, wherein the water is present in the detailing agent in an amount ranging from about 50 wt % to about 99 wt %.

8. The multi-fluid kit of claim 1, wherein:
the detailing agent includes from about 60 wt % to about 94 wt % of water, from about 5 wt % to about 35 wt % of an organic cosolvent, and from about 1 wt % to about 10 wt % of an organosilane, based on a total weight of the detailing agent; and
the fusing agent includes from about 60 wt % to about 94 wt % of water, from about 5 wt % to about 35 wt % of an organic cosolvent, and from about 1 wt % to about 20 wt % of a radiation absorber, based on a total weight of the fusing agent.

9. A three-dimensional printing kit, comprising:
a fusing agent comprising water and a radiation absorber, wherein the radiation absorber absorbs radiation energy and converts the radiation energy to heat;
a detailing agent comprising water and from about 0.1 wt % to about 20 wt % of organosilanes based on a total weight of the detailing agent, wherein the organosilanes include an organosilane compound with a central silicon having both a water-solubilizing group and multiple hydrolyzable moieties attached to the central silicon; and
a powder bed material including from about 60 wt % to 100 wt % of polymeric particles,
wherein the organosilanes are reactive with one another to form polysiloxanes that are chemically independent relative to the polymeric particles.

10. The three-dimensional printing kit of claim 9, wherein the polymeric particles are selected from the group consisting of polyamide particles, polyethylene particles, thermoplastic polyurethane particles, polypropylene particles, polyester particles, polycarbonate particles, polyether ketone particles, polyacrylate particles, polystyrene particles, wax particles, and a combination thereof.

11. The three-dimensional printing kit of claim 9, wherein the organosilanes are selected from the group consisting of dialkoxysilanes, trialkoxysilanes, and a combination thereof.

12. The three-dimensional printing kit of claim 9, wherein the water-solubilizing group is a polyethylene oxide urethane.

13. A method of making a three-dimensional printed article, comprising:
iteratively applying individual build material layers of a powder bed material including polymer particles to a powder bed;
based on a three-dimensional object model, selectively jetting a fusing agent onto individual build material layers, wherein the fusing agent comprises water and a radiation absorber;
based on the three-dimensional object model, selectively jetting a detailing agent onto individual build material layers laterally at a border between a first area where the powder bed material is contacted by the fusing agent and a second area where the powder bed material is not contacted by the fusing agent, wherein the detailing agent comprises water and from about 0.1 wt % to about 20 wt % of organosilanes based on a total weight of the detailing agent, wherein the organosilanes include an organosilane compound with a central silicon having both a water-solubilizing group and multiple hydrolyzable moieties attached to the central silicon; and
exposing the powder bed material to energy to selectively fuse the polymer particles in contact with the radiation absorber to form a fused polymer matrix at individual build material layers.

14. The method of claim 13, wherein the organosilanes forms polysiloxanes at the border that are chemically independent relative to the polymeric particles.

15. The method of claim 13, wherein during the exposing, the energy and the radiation absorber together raise a temperature of the polymer particles in contact with the radiation absorber to a range of from about 100° C. to about 250° C. to fuse the polymer particles in contact with the radiation absorber.

* * * * *